(12) United States Patent
Bigaj et al.

(10) Patent No.: US 12,106,191 B2
(45) Date of Patent: Oct. 1, 2024

(54) CONTINUOUS LEARNING PROCESS USING CONCEPT DRIFT MONITORING

(71) Applicant: International Business Machines Corporation, Armonk, NY (US)

(72) Inventors: Rafal Bigaj, Cracow (PL); Wojciech Sobala, Cracow (PL); Lukasz G. Cmielowski, Cracow (PL); Maksymilian Erazmus, Zasów (PL)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 17/185,666

(22) Filed: Feb. 25, 2021

(65) Prior Publication Data

US 2022/0269984 A1    Aug. 25, 2022

(51) Int. Cl.
*G06N 20/00*    (2019.01)
*G06F 11/34*    (2006.01)
*G06F 18/214*   (2023.01)

(52) U.S. Cl.
CPC ......... *G06N 20/00* (2019.01); *G06F 11/3452* (2013.01); *G06F 18/2155* (2023.01)

(58) Field of Classification Search
CPC . G06N 20/00; G06F 18/2155; G06F 11/3452; G06F 11/2452
See application file for complete search history.

(56) References Cited

U.S. PATENT DOCUMENTS

| | | | |
|---|---|---|---|
| 11,669,753 B1* | 6/2023 | Gupta | G06N 5/04 706/12 |
| 2017/0372232 A1 | 12/2017 | Maughan | |
| 2020/0012900 A1* | 1/2020 | Walters | G06N 20/20 |
| 2020/0082296 A1* | 3/2020 | Fly | G06N 7/01 |
| 2020/0151619 A1* | 5/2020 | Mopur | H04L 67/12 |
| 2020/0193321 A1* | 6/2020 | Shao | G06N 20/00 |
| 2021/0064981 A1* | 3/2021 | Turgeman | G06N 3/084 |
| 2021/0174216 A1* | 6/2021 | Farrell | G06N 5/022 |
| 2021/0342544 A1* | 11/2021 | Galle | G06F 40/30 |

OTHER PUBLICATIONS

"IBM Watson is AI for business," https://www.ibm.com/watson, printed Feb. 25, 2021.
"IBM Watson OpenScale," https://www.ibm.com/cloud/watson-openscale, printed Feb. 25, 2021.

* cited by examiner

*Primary Examiner* — Kyle R Stork
(74) *Attorney, Agent, or Firm* — David K. Mattheis (57) ABSTRACT

Embodiments of present disclosure relate to a method for predicting a performance of a machine learning module (ML-Module). The method may comprise detecting a change in the performance of the ML-Module over a period of time on the basis of labeled input datasets for the ML-Module and detecting a change in a predicted performance of the ML-Module over the period of time computed using the drift module. A value of a first key figure is determined, the value of the first key figure indicating a correlation between the change in the performance of the ML-Module and the change in the predicted performance of the ML-Module. A signal is provided, the signal indicating the value of the first key figure.

20 Claims, 5 Drawing Sheets

Fig. 7 detecting a change in a performance of an ML-Module over a period of time on the basis of labeled input datasets for the ML-Module, respective target values for the ML-Module and respective output values of the ML-Module, the output values being generated on the basis of the labeled input datasets by means of the ML-Module, the labeled input datasets being provided individually to the ML-Module over the period of time
801 detecting a change in a predicted performance of the ML-Module over the period of time, a drift module being configured to compute a single value of the predicted performance on the basis of each input dataset of a set of input datasets, the input datasets of the set of input datasets being provided individually to the drift module over the period of time
802 determining a value of a first key figure, the value of the first key figure indicating a correlation between the change in the performance of the ML-Module and the change in the predicted performance of the ML-Module
803 providing a signal, the signal indicating the value of the first key figure
804

Fig. 8

CONTINUOUS LEARNING PROCESS USING CONCEPT DRIFT MONITORING

BACKGROUND

The present disclosure generally relates to the field of machine learning, and more specifically, to the field of predicting performances of machine learning modules.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One application of these new capabilities is machine learning (ML). ML systems generally use models trained to perform a task. Those models may be based on inferences or predictions made from a given input value, and are typically created (i.e., trained) using large data sets. The resulting models may be used to perform a variety of tasks, such as speech recognition, subject recognition in images, generating content recommendations to a user of an application or website, and autonomous control of motor vehicles.

SUMMARY

Various embodiments provide a computer system and a method as described by the subject matter of the independent claims. Advantageous embodiments are described in the dependent claims. Embodiments of the present disclosure can be freely combined with each other if they are not mutually exclusive.

In one aspect, the disclosure includes a method for predicting a performance of a machine learning module (ML-Module) on the basis of an input dataset of a set of input datasets for the ML-Module, the set of input datasets comprising unlabeled input datasets and labeled input datasets, the labeled input datasets each being assigned to a respective target value of a respective output value of the ML-Module. The method may comprise:
  detecting a change in performance of an ML-Module over a period of time using a labeled input dataset for the ML-Module, a target value for the ML-Module, and an output value of the ML-Module, the output value being generated using the labeled input dataset with the ML-Module, the labeled input dataset being provided individually to the ML-Module over the period of time;
  detecting a change in predicted performance of the ML-Module over the period of time by a drift module, the drift module being configured to compute a single value of the predicted performance using each input dataset of a set of input datasets, the input datasets of the set of input datasets being provided individually to the drift module over the period of time;
  determining a value of a first key figure, the value of the first key figure indicating a correlation between the change in performance of the ML-Module and the change in predicted performance of the ML-Module; and
  providing a signal that indicates the value of the first key figure.

In another aspect, the disclosure includes a computer program product for monitoring a drift module, the computer program product comprising one or more computer-readable storage media, and program instructions collectively stored on the one or more computer-readable storage media. The program instructions may comprise:
  detecting a change in performance of an ML-Module over a period of time using a labeled input dataset for the ML-Module, a target value for the ML-Module, and an output value of the ML-Module, the output value being generated using the labeled input dataset with the ML-Module, the labeled input dataset being provided individually to the ML-Module over the period of time;
  detecting a change in predicted performance of the ML-Module over the period of time by a drift module, the drift module being configured to compute a single value of the predicted performance using each input dataset of a set of input datasets, the input datasets of the set of input datasets being provided individually to the drift module over the period of time;
  determining a value of a first key figure, the value of the first key figure indicating a correlation between the change in performance of the ML-Module and the change in predicted performance of the ML-Module; and
  providing a signal that indicates the value of the first key figure.

In another aspect, the disclosure includes a computer system for monitoring a drift module, the drift module being configured to predict a performance of a machine learning module (ML-Module) on the basis of an input dataset of a set of input datasets for the ML-Module, the set of input datasets comprising unlabeled input datasets and labeled input datasets, the labeled input datasets each being assigned to a respective target value of a respective output value of the ML-Module. The computer system may be configured for:
  detecting a change in performance of an ML-Module over a period of time using a labeled input dataset for the ML-Module, a target value for the ML-Module, and an output value of the ML-Module, the output value being generated using the labeled input dataset with the ML-Module, the labeled input dataset being provided individually to the ML-Module over the period of time;
  detecting a change in predicted performance of the ML-Module over the period of time by a drift module, the drift module being configured to compute a single value of the predicted performance using each input dataset of a set of input datasets, the input datasets of the set of input datasets being provided individually to the drift module over the period of time;
  determining a value of a first key figure, the value of the first key figure indicating a correlation between the change in performance of the ML-Module and the change in predicted performance of the ML-Module; and
  providing a signal that indicates the value of the first key figure.

BRIEF DESCRIPTION OF DRAWINGS

The following embodiments of the disclosure are explained in greater detail, by way of example only, making reference to the drawings in which.

DETAILED DESCRIPTION

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to help explain the principles of the embodiments, the practical application or technical improvement over technologies found in the marketplace, or to enable others of ordinary skill in the art to understand the embodiments disclosed herein.

Input data for a machine learning module (ML-Module) may be analyzed in order to predict a performance of the ML-Module when the ML-Module is used after it was trained and tested. Generally, training and test data may be used for training and testing of the ML-Module. Usage of the ML-Module may comprise providing the input data to an input of the ML-Module.

An actual performance of the ML-Module during usage may be predicted by analyzing a prior performance of the ML-Module during the testing based on the test data and by comparing the input data with the test data. Such a comparison may be performed by using a monitoring module, often called drift module. Based on a result of the comparison, a user may decide if a calculated output value of the ML-Module being computed based on the input data may be used for an application of the ML-Module or may rather be rejected. A rejection may occur due to a variety of reasons, e.g., for security reasons.

By indicating the value of the first key figure, a user may be able to assess, according to the value of the first key figure, if the drift module may be able to perform accurate predictions of the performance of the ML-Module in the future. If the correlation between the change in the performance of the ML-Module and the change in the predicted performance of the ML-Module is comparatively low, the drift module may not be able to predict the performance of the ML-Module on a satisfying level. In this case, the drift module may be retrained. This may then allow for more accurate predictions of the performance of the ML-Module in the future using the retrained drift module.

In many cases, the change in the performance of the ML-Module may refer to a deterioration of the performance of the ML-Module. Similarly, the change in the predicted performance of the ML-Module may refer to a deterioration of the predicted performance of the ML-Module. The deterioration of the predicted performance may, for example, be accompanied by a decline of a value of the predicted performance. The phrase "predicted performance" may thus refer to the phrase "value of the predicted performance" in the following and above.

The term "module" as used herein may refer to any hardware, software such as an executable program, artificial intelligence, fuzzy-logic, or combination hereof for performing a function associated with the "module" or being a result of having performed the function associated with the "module".

The ML-Module in some embodiments may comprise a neural net, such as a convolutional neural net and/or a radial basis function net. The ML-Module may be configured to generate respective output datasets each on the basis of one corresponding input dataset of the set of input datasets. Each output dataset may comprise a single output value or several output values, depending on a use case of the ML-Module. In the former case, to each labeled input dataset, the respective target value of the respective output value may be assigned. In the latter case, to each labeled input dataset, a respective set of target values of respective output values of each output dataset may be assigned. The sets of target values may be referred to as target datasets in the following.

The input datasets and the output datasets may comprise values, e.g., real values, as data elements. The ML-Module may perform a calculation of each output dataset dependent on the corresponding input dataset and on values of parameters of the ML-Module. In some embodiments, the values of each output dataset may represent a probability indicating in which output category of several possible categories the respective input dataset may be categorized. The input datasets may be presented to an input of the ML-Module during a usage of the ML-Module. During usage, the ML-Module may be in a trained state.

The ML-Module may be generated, also referred to as trained, on the basis of training datasets using machine learning. Each training dataset may comprise an input dataset and an output dataset. Analogously to the input datasets and the output datasets mentioned above, the input datasets and the output datasets of the training datasets may comprise values, e.g., real values, as data elements. In the following the term "input dataset" and "input datasets" may refer to the input dataset of the set of input datasets and the input datasets of the set of input datasets respectively.

The term "machine learning" may refer to a type of computer model used to extract useful information from the input datasets and the output datasets of the training datasets. The information may be extracted by building probabilistic models in an automated way. The machine learning may be performed using one or more machine learning techniques, such as linear regression, backpropagation, K-means, classification algorithms, etc.

A probabilistic model may, for example, comprise an equation or set of rules that may enable the determination of the output category on the basis of one of the input datasets or to group an instance corresponding to one of the input datasets into a cluster or the output category. The probabilistic model may determine the output category on the basis of several output values of the probabilistic model, the output values each being assigned to one category. By selecting that category that is assigned to the highest output value, the output category may be determined.

The one or more machine learning techniques may adapt the values of the parameters of the ML-Module such that a training error of the ML-Module may be reduced. The training error may be calculated on the basis of deviations of calculated values of training output datasets of the ML-Module calculated by the ML-Module from the values of each output dataset of the respective training datasets. Each training output dataset of the ML-Module may be calculated on the basis of the input dataset of the respective training dataset, and may therefore be associated to the respective training dataset. The training output datasets of the ML-Module may have the same structure as the output datasets of the training datasets, e.g., types of elements of the training output datasets of the ML-Module may match types of elements of the output datasets of the training datasets.

Adapting the values of the parameters of the ML-Module on the basis of the deviations may reduce the training error. Hence, the values of the output datasets of the training datasets may be considered as target values for the ML-Module during a training of the ML-Module. If the training error reaches a given threshold, the ML-Module may be regarded as being trained and being in the trained state.

The training datasets may be chosen such that the input datasets of the training datasets may be distributed as equal as possible in an input parameter space of the ML-Module and/or that they may represent many important use cases the ML-Module may be applied to. A distribution of the training datasets may be designed such that the training error may be as low as possible. That may imply that in different regions of the input parameter space, a density of the training datasets may be different. Recommended different densities of the training datasets in the input parameter space may be calculated using design of experiments (DOE) techniques. The different densities may be considered as training clusters.

Generally, the training datasets may be obtained in a supervised manner, e.g., by obtaining them considering the recommended densities, by obtaining them in supervised and/or designed experiments, and/or by selecting the training datasets from a set of experimental datasets. This kind of supervising may be performed by an expert in a field of application of the ML-Module. For that reason, the training datasets may represent a knowledge of the expert. The field of application may be mechanical engineering, for example the design, construction or controlling of machines.

In the trained state, the ML-Module may be used to generate the above mentioned output datasets each in response to one of the provided input dataset at the input of the ML-Module. The input datasets may be provided by a user sending the input datasets to the ML-Module. Providing the input datasets for generating the output datasets may be referred to as an application of the ML-Module in the following. The performance of the ML-Module refers to the performance during the application of the ML-Module.

In some embodiments, the method may comprise labeling a first part of the input datasets by creating the above mentioned target datasets each target dataset being assigned to one of the input datasets of the first part. The first part of the input datasets being labeled may constitute the labeled input datasets. The labeling may be performed by a user, which may be the expert. In another example, the labeling may be performed automatically by reading in a value of a sensor of a machine. This may be useful if the sensor may not be applied permanently due to cost issues.

The drift module may be configured to predict the performance of the ML-Module, in the following also referred to as performance. Generally, the performance may be measured, for example, by calculating an accuracy of the ML-Module. Thus, the drift module may predict the performance of the ML-Module by predicting the accuracy of the ML-Module. The drift module may be configured to predict the performance by analyzing the input dataset.

The input dataset may be the one of the input datasets being sent to the input of the ML-Module at an actual instant of time. At the actual instant of time, the drift module may provide information serving for a decision of using an actual output dataset being computed on the basis of the input dataset using the ML-Module. This information may be in the form of the predicted performance, for example in the form of a predicted accuracy of the ML-Module.

The drift module may be configured to compute the predicted performance on the basis of a result of an analysis of the input dataset. The drift module may perform the analysis of the input dataset by performing a comparison of the input dataset with test datasets.

The test datasets may be obtained in the supervised manner as the training datasets, e.g., by obtaining them considering the recommended densities, by obtaining them in supervised and/or designed experiments and/or by selecting the test datasets from the set of experimental datasets. Similarly, this kind of supervising may be performed by the expert in the field of application of the ML-Module. For practical reasons, the test datasets may be disjoint from the training datasets.

The trained ML-Module may be tested on the basis of the test datasets in order to determine a test performance.

Each test dataset may comprise an input dataset and an output dataset. Analogously to the input datasets and the output datasets mentioned above, the input datasets and the output datasets of the test datasets may comprise values, e.g., real values, as data elements. The input datasets of the test datasets may be sent to the input of the ML-Module during a testing of the ML-Module.

The test performance may be calculated on the basis of deviations of calculated values of test output datasets of the ML-Module calculated by the ML-Module from the values of each output dataset of the respective test datasets. Each test output dataset of the ML-Module may be calculated on the basis of the input dataset of the respective test dataset and may therefore be associated to the respective test dataset. The test output datasets of the ML-Module may have the same structure as the output datasets of the test datasets, e.g., types of elements of the test output datasets of the ML-Module may match types of elements of the output datasets of the test datasets. In one example, the test performance may be calculated by computing an average of the deviations of respective values of the test output datasets from the values of the output datasets of the test datasets.

The input datasets of the test datasets may be stored together with the corresponding deviations of the values of the test output datasets being computed based on the respective test datasets in a database. Analogously, the input datasets of the training datasets may be stored together with corresponding deviations of values of training output datasets being computed based on the respective training datasets in the database. The corresponding deviations of the values of the training output datasets may be computed in a similar manner as the corresponding deviations of the values of the test output datasets. Additionally, instead of the test datasets, the training datasets may be used in some embodiments.

The stored input datasets of the test and the training datasets may be grouped according to their respective deviations of the values of the respective test output datasets and respective training output datasets respectively. For example, a first part of these datasets may be grouped in a low performing class if their corresponding averaged deviations of the values are comparatively high, for example greater than eighty percent of the averaged deviations. A second part of these datasets may be grouped in a high performing class if their corresponding averaged deviations of the values are comparatively low, for example less than twenty percent of the averaged deviations. The rest of these datasets may be grouped in an average performing class.

According to some embodiments, the computing of the predicted performance of the ML-Module may comprise comparing the input dataset with datasets of a further set of datasets, for example by the drift module. The further set of datasets may comprise the training datasets and the test datasets. For example, the drift module may perform a comparison of the input dataset with each input dataset of the test datasets and/or with each input dataset of the training datasets. The comparison may involve computing respective cosine distances between the input dataset and the corresponding input dataset of the test datasets and/or the corresponding input dataset of the training datasets. The drift module may assign the input dataset to one or more input datasets of the further set of datasets on the basis of a result of the comparison.

In one example, the drift module may compute the predicted performance of the ML-Module equal to "1" if the input dataset of the test or training dataset the input dataset may be assigned to is grouped in the high performing class. Following this example, the drift module may compute the predicted performance of the ML-Module equal to "0" if the input dataset of the test or training dataset the input dataset may be assigned to is grouped in the low performing class. In the other cases, the drift module may compute the predicted performance of the ML-Module equal to other values, such as "0.5", if the input dataset is to be grouped into other classes.

Computing the predicted performance dependent on the comparison of the input dataset with the input datasets of the set of further datasets may enable the user to follow the computing of the predicted performance in a transparent manner. Thus, a classification using the drift module to determine if the ML-Module may perform well or poor given the input dataset may be immediately understood by the user.

In some embodiments, the ML-Module may be in a trained and tested state as described above. The training and the testing of the ML-Module may be performed using training datasets and test datasets respectively as described above. Accordingly, the drift module may be generated using the further set of datasets, the further set of datasets comprising the training datasets and the test datasets. The drift module may be built in the form of a "black-box-model" according to this embodiment. This may have the advantage that no knowledge of the expert or the user may be necessary to create the drift module. The above described deviations of the training and test datasets may serve each as a target value for a training of the drift module. Calculating the predicted performance of the ML-Module on the basis of the input dataset using the drift module may be considered as an interpolation. The closer the input dataset is to one of the input datasets of the training or test datasets the closer a predicted deviation may be to that deviation to which the one of the input datasets of the training or test datasets may be assigned to.

In some embodiments, the signal may comprise a first alarm signal. Accordingly, the method may further comprise generating the first alarm signal if the value of the first key figure is less than a first threshold. The first alarm signal may indicate a need for retraining the drift module. The first threshold may be determined by the user. Generating the first alarm signal may have the advantage that the user does not have to check the value of the first key figure by himself/herself.

In some embodiments, the signal may comprise a second alarm signal. Accordingly, the method may further comprise generating the second alarm signal if the value of the first key figure is less than a first threshold and the change in the performance of the ML-Module is greater than a second threshold. The second alarm signal may indicate a need for retraining the drift module. This may enable generation of the alarm only if the performance of the ML-Module is greater than the second threshold. This may be efficient, as a very low change in the performance of the ML-Module may not require necessarily a retraining of the drift module. Thus, in some embodiments, a type of "false alarms" potentially generated by the first alarm signal may be prevented.

In some embodiments, the signal may comprise a third alarm signal. Accordingly, the method may further comprise generating the third alarm signal if the change in the performance of the ML-Module is greater than a third threshold. The third alarm signal may indicate a need for retraining the ML-Module. If the change of the performance of the ML-Module may be observed in order to generate the second alarm signal, this type of observation may as well be used to decide if the ML-Module may need a retraining. Hence, these embodiments may benefit from computations done with respect to observing the correlation between the change in the performance of the ML-Module and the change in the predicted performance of the ML-Module.

In some embodiments, the method may further comprise identifying a first set of the unlabeled input datasets causing the change in the performance of the ML-Module. The input datasets of the first set of the unlabeled input datasets may be marked such that the input datasets of the first set of the unlabeled input datasets are visible for the user for labeling the input datasets of the first set of the unlabeled input datasets. These embodiments may enable the user to label the unlabeled input datasets causing the change in the performance of the ML-Module. Once, these unlabeled input datasets are labeled, these input datasets may be used together with their label to enrich the training datasets for a retraining of the drift module.

The first set of the unlabeled input datasets may be identified by using statistical methods. In one example, the first set of the unlabeled input datasets may be identified by performing a comparison between the input datasets of the first set of the unlabeled input datasets and the input datasets of the training and/or test datasets. For example, points represented by the input datasets may be analyzed with clusters of points represented by the input datasets of the training datasets. The input datasets representing points which may not be captured by these clusters may be identified as the first set of the unlabeled input datasets causing the change in the performance of the ML-Module.

In some embodiments, the method may further comprise, in response to labeling the input datasets of the first set of the unlabeled input datasets, retraining the drift module using these input datasets. In response to a retraining of the drift module using these input datasets, the drift module may be in a retrained state. The predicted performance of the ML-Module may be computed more accurately using the drift module being in the retrained state. This may allow to take a more confident decision whether to use the actual output dataset being computed on the basis of the input dataset using the ML-Module.

In some embodiments, the method may further comprise, in response to labeling the input datasets of the first set of the unlabeled input datasets, retraining the ML-Module using these input datasets. These input datasets may cover regions of the input space of the ML-Module not being covered by the input datasets of the training datasets, in the following referred to as new regions. Therefore, the retraining the ML-Module using these input datasets may rebuild the ML-Module such that the ML-Module may produce reasonable future output values on the basis of future input datasets which lie in the new regions.

In some embodiments, the method may further comprise determining the performance of the ML-Module using the accuracy of the ML-Module as a performance measure.

In some embodiments, the method may further comprise determining the performance of the ML-Module using a precision of the ML-Module as the performance measure.

In some embodiments, the ML-Module may be in the trained and tested state. The training and the testing of the ML-Module may be performed using training datasets and test datasets respectively, for example as described above. In these embodiments, the drift module may be generated using the further set of datasets, the further set of datasets comprising the training datasets and the test datasets. Furthermore, according to these embodiments, the method may further comprise performing an analysis of the further set of datasets, performing an analysis of the set of input datasets and determining a value of a second key figure on the basis of the analysis of the further set of datasets and the analysis of the set of input datasets. The value of the second key figure may indicate a deviation of the datasets of the further set as a whole from the input datasets of the set of input datasets as a whole, in the following also referred to as data deviation. According to this embodiment, a second signal may be provided. The second signal may indicate the value of the second key figure. This embodiment may allow the user to monitor the data deviation.

The data deviation may, for example, be in the form of a deviation of a mean value of the further datasets from a mean value of the set of input datasets. If the data deviation is comparatively high, for example greater than a fourth threshold, the user may conclude that the ML-module and/or the drift module may no longer deliver reliable results. Compared to the determining of the first key figure, the determining of the second key figure may have the advantage that the second key figure may be calculated without using the labeled input datasets. In case, the labeling may require human interaction, the first key figure may not be determined without that human interaction. On the other hand, the second key figure may be calculated in a fully automated manner as the analysis of the set of input datasets may be performed analyzing just the unlabeled input datasets of the set of input datasets. Thus, in case a number of the labeled input datasets may be very low or equal to zero and the first key figure may not be a reliable measurement, the second key figure may be used to make the decision of using the actual output dataset and/or to retrain the drift module.

In some embodiments, the second signal may comprise a fourth alarm signal. The method in these embodiments may further comprise generating the fourth alarm signal if the value of the second key figure is greater than a fourth threshold. The fourth alarm signal may indicate a need for retraining the ML-Module. The fourth threshold may be prescribed by the user or the expert such that the fourth alarm signal may alert the user or the expert in case the data deviation may be noticeable by the user or the expert. Setting the fourth threshold may therefore prevent false alarms which may occur due to statistical fluctuations. Furthermore, if the data deviation may be noticeable by the user or the expert, the data deviation may be that strong to the extent that the retraining of the ML-module may be recommendable. In addition to that, providing the fourth alarm signal the user may be no more obliged to check the second key figure manually.

In some embodiments, the second signal may comprise a fifth alarm signal. The method in these embodiments may further comprise generating the fifth alarm signal if the value of the second key figure is greater than a fifth threshold. The fifth alarm signal may indicate a need for retraining the drift module. The fifth threshold may be prescribed by the user or the expert such that the fifth alarm signal may alert the user or the expert in case the data deviation may be noticeable by the user or the expert. Setting the fifth threshold may therefore prevent false alarms which may occur due to statistical fluctuations. Furthermore, if the data deviation may be noticeable by the user or the expert, the data deviation may be so strong that the retraining of the ML-module may be recommendable. In addition to that, by providing the fifth alarm signal, the user may be no more obliged to check the second key figure manually. The fifth threshold may differ from the fourth threshold. This may be due to the reason that a sensitivity of the ML-module with respect to the input datasets may be different from a sensitivity of the drift module with respect to the input datasets. For example, the drift module may separate the input space differently to the ML-Module and may therefore comprise a different sensitivity.

In some embodiments, the second signal may comprise a sixth alarm signal. The method in these embodiments may further comprise generating the sixth alarm signal if the value of the second key figure is less than a sixth threshold and the change in the performance of the ML-Module is greater than a seventh threshold. The sixth alarm signal may indicate a need for retraining the drift module. The seventh threshold may be equal to the second threshold mentioned above. The sixth and/or seventh threshold may be prescribed by the user or the expert. The seventh threshold may be prescribed such that the sixth alarm signal may alert the user or the expert in case the change in the performance of the ML-Module may be noticeable by the user or the expert. The sixth alarm signal may be prescribed such the sixth alarm signal may alert the user or the expert in case the data deviation is not noticeable by the user or the expert. The sixth alarm signal may be produced if the data deviation may be calculated based only on the unlabeled input datasets. This may be rare, but in cases wherein an influence of the user or the expert on the monitoring of the input datasets should be minimized, this may occur. Furthermore, the sixth alarm may be produced if the labeled input datasets may comprise a different distribution compared to the unlabeled input datasets. This may occur if a number of the input datasets is comparatively low.

Generally, the sixth alarm signal may alarm the user or the expert in case the change in the performance of the ML-Module may be noticeable due to the data deviation, but the data deviation may not be detected by using the second key figure. In this case it may be recommendable to retrain the drift module.

Figure 1:
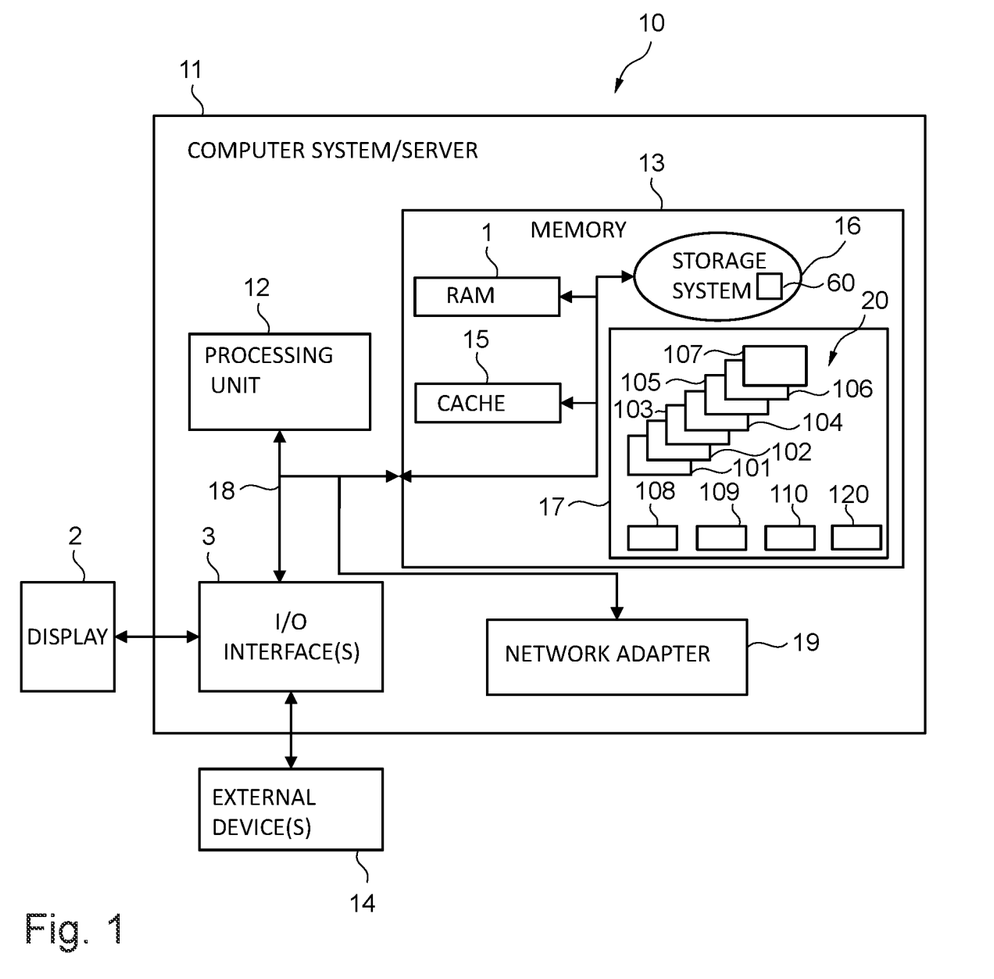
FIG. 1 illustrates a computer system in accordance with some embodiments of the present subject matter.

Embodiments of the present disclosure may be implemented using a computing device that may also be referred to as a computer system, a client, or a server. Referring now to FIG. 1, a schematic of an example of a computer system 10 consistent with some embodiments is shown. The computer system 10 may be only one example of a suitable computer system and may be not intended to suggest any limitation as to the scope of use or functionality of embodiments of the disclosure described herein. Regardless, computer system 10 is capable of being implemented and/or performing any of the functionality set forth herein.

The computer system 10 may comprise a computer system/server 11, which may be operational with numerous other general purpose or special purpose computing system environments or configurations. Examples of well-known computing systems, environments, and/or configurations that may be suitable for use with computer system/server 11 include, but are not limited to a personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, etc.

Computer system/server 11 may be described in the general context of computer system executable instructions, such as program modules, being executed by a computer system. Generally, program modules may include routines, programs, objects, components, logic, data structures, and so on that perform particular tasks or implement particular abstract data types. Computer system/server 11 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 11 in computer system 10 may be in the form of a general-purpose computing device. The components of computer system/server 11 may include, but are not limited to, one or more processors or processing units 12, a system memory 13, and a bus 18 that couples various system components including system memory 13 to processor 12. Bus 18 may represent one or more of any of several types of bus structures, including a memory bus or memory controller, a peripheral bus, an accelerated graphics port, and a processor or local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 11 may include a variety of computer system readable media. Such media may be any available media that is accessible by computer system/server 11, and it may include both volatile and non-volatile media, removable and non-removable media.

System memory 13 can include computer system readable media in the form of volatile memory, such as random access memory (RAM) 1 and/or cache memory 15. Computer system/server 11 may further include other removable/non-removable, volatile/non-volatile computer system storage media. By way of example only, storage system 16 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 13 may include at least one program product having a set (e.g., at least one) of program modules that are configured to carry out the functions of embodiments of the disclosure.

Program/utility 17, having a set (e.g., at least one) of program modules 20, may be stored in memory 13 by way of example, and not limitation, as well as an operating system, one or more application programs, other program modules, and program data. Each of the operating system, one or more application programs, other program modules, and program data or some combination thereof, may include an implementation of a networking environment. Program modules 20 generally may be configured to carry out the functions and/or methodologies of embodiments of the disclosure as described herein.

The term "program" or "program module" as used herein refers to a set of instructions that contains commands to provoke actions performed by the processor 12 when the processor 12 may read the commands. The set of instructions may be in the form of a computer-readable program, routine, subroutine, or part of a library, which may be executed by the processor 12 and/or may be called by a further program being executed by the processor 12. In some embodiments, the program modules 20 may be executable programs which are compiled according to a type of hardware platform of the computer system/server 11.

Computer system/server 11 may also communicate with one or more external devices 14 such as a keyboard, a pointing device, a display 2, etc.; one or more devices that enable a user to interact with computer system/server 11; and/or any devices (e.g., network card, modem, etc.) that enable computer system/server 11 to communicate with one or more other computing devices. Such communication can occur via Input/Output (I/O) interfaces 3. Still yet, computer system/server 11 may communicate with one or more networks such as a local area network (LAN), a general wide area network (WAN), and/or a public network (e.g., the Internet) via network adapter 19. As depicted, network adapter 19 may communicate with the other components of computer system/server 11 via bus 18. It should be understood that although not shown, other hardware and/or software components could be used in conjunction with computer system/server 11. Examples, include, but are not limited to: microcode, device drivers, redundant processing units, external disk drive arrays, RAID systems, tape drives, and data archival storage systems, etc.

A computer system such as the computer system 10 shown in FIG. 1 may be used for performing operations disclosed herein, for example, such as a first, second, third, fourth, fifth, sixth and seventh operation. The computer system 10 may be configured to perform the first, second, third, fourth, fifth, sixth and seventh operation.

Figure 3:
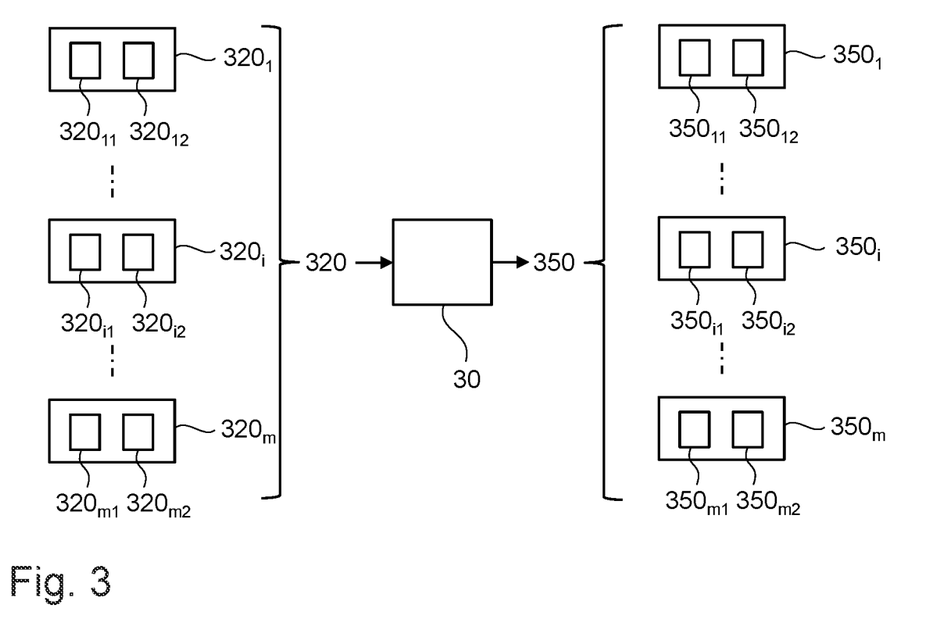
FIG. 3 depicts a machine learning module provided by the computer system of FIG. 1, according to some embodiments.
Figure 4:
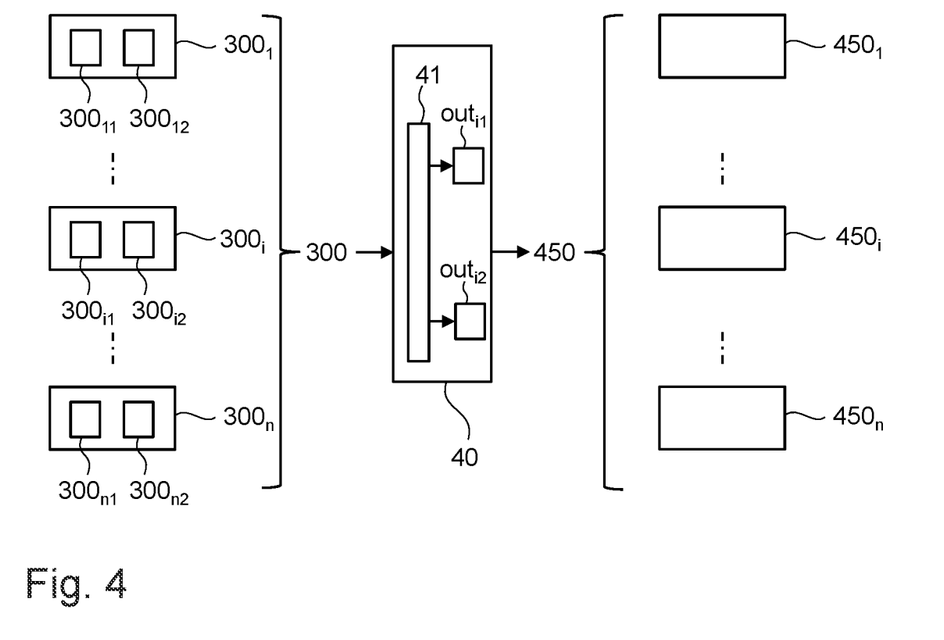
FIG. 4 depicts a drift module provided by the computer system of FIG. 1, according to some embodiments.
Figure 5:
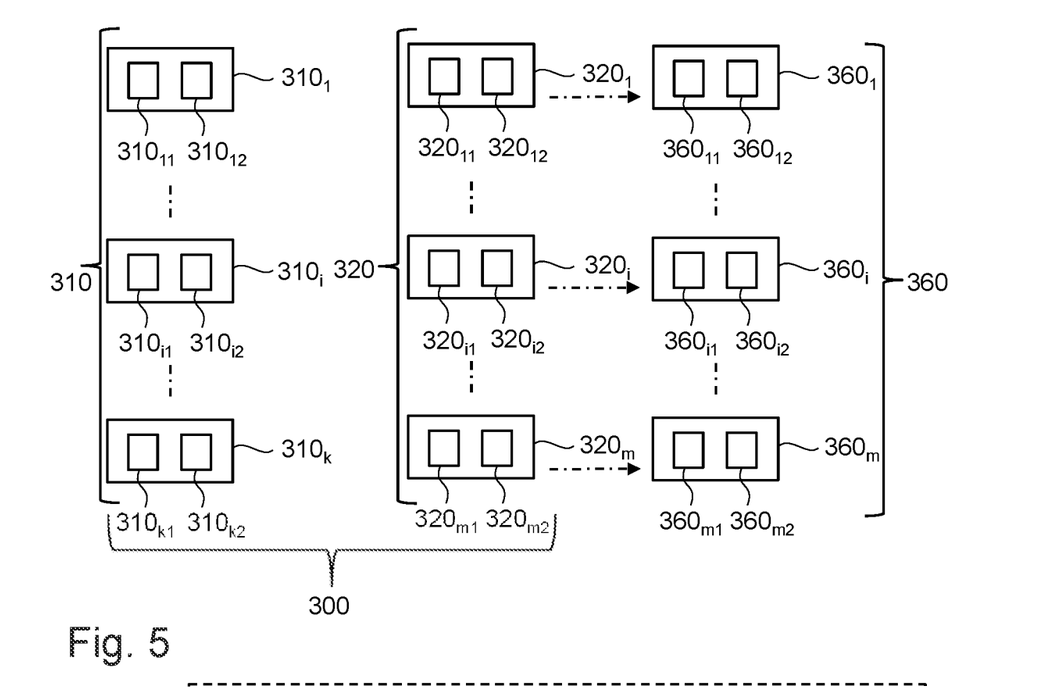
FIG. 5 depicts examples of unlabeled input datasets, labeled input datasets and target datasets for the machine learning module of FIG. 3.

The computer system 10 may be configured for monitoring a drift module 40 shown in FIG. 4, consistent with some embodiments. The drift module 40 may be configured to predict a value of a performance of a machine learning module (ML-Module) 30 as shown in FIG. 3 on the basis of an input dataset of a set of input datasets 300 for the ML-Module 30. The set of input datasets 300 may comprise unlabeled input datasets 310 and labeled input datasets 320. The labeled input datasets 320 may each be assigned to a respective target dataset $360_i$ of a respective output dataset $350_i$ of the ML-Module 30 as shown in FIG. 5, consistent with some embodiments. Such an assigning may also be called labeling. The labeling may be performed by the user, the expert or automatically by using a sensor as described above.

The ML-Module 30 may be configured to compute one or more values of the respective output dataset $350_i$, for example and according to a first use case a first value $350_{i1}$ and a second value $350_{i2}$, on the basis of the respective labeled input dataset $320_i$ being assigned to the respective target dataset $360_i$. According to the first use case, each target dataset $360_i$ may comprise a first value $360_{i1}$ and a second value $360_{i2}$. The user or expert may input the first values $360_{i1}$ and second values $360_{i2}$ via the interface 3 during the period of time. In doing so, a number of "m" target datasets 360 and thus a number of "m" labeled input dataset $320_i$ may be generated during the period of time. A number of the indices of the labeled input datasets 320 may refer to an instant of time the labeled input datasets 320 are generated. Hence, the higher the index of the labeled input datasets 320 the later the corresponding input dataset may be labeled within the period of time.

The first operation may comprise detecting a change in the performance of the ML-Module 30 over a period of time on the basis of the labeled input datasets 320 for the ML-Module 30, the respective target datasets 360 for the ML-Module and the respective output datasets 350 of the ML-Module. The output datasets 350 may be generated on the basis of the labeled input datasets 320 using the ML-Module 30. The labeled input datasets 320 may be sent individually to the ML-Module 30 over the period of time.

In one example, the processor 12 may compute the performance of the ML-Module 30, i.e. a single value of the performance of the ML-Module 30, on the basis of a single output dataset $350_i$ and a single target dataset $360_i$. For example, the processor 12 may compute an i-th value of the performance of the ML-Module 30 dependent on an i-th first deviation indicating a deviation of the first value $350_{i1}$ of the i-th output dataset $350_i$ from the first value $360_{i1}$ of the i-th target dataset $360_i$ and an i-th second deviation indicating a deviation of the second value $350_{i2}$ of the i-th output dataset $350_i$ from the second value $360_{i2}$ of the i-th target dataset $360_i$. The processor 12 may calculate the i-th value of the performance dependent on the i-th first and the i-th second deviation, for example in the form of an average value of the i-th first and the i-th second deviation.

According to one example, the processor 12 may detect the change in the performance of the ML-Module 30 by comparing the calculated i-th performance of the ML-Module 30 with the calculated (i−1)-th performance of the ML-Module 30. The (i−1)-th performance may be determined by the processor 12 before, for example one time step or one time interval during the period of time before, the processor 12 may calculate the i-th performance. In one example, the processor 12 may determine the change in the performance by computing the difference between the i-th performance and the (i−1)-th performance.

Furthermore, the processor 12 may compute a first averaged value of the performance of the ML-Module 30 on the basis of several computed first performances during first time intervals within the period of time. Analogously, the processor 12 may compute a second averaged value of the performance of the ML-Module 30 on the basis of several computed second performances during second time intervals within the period of time. According to this example, the processor 12 may compute the change in the performance by computing the difference between the first and second averaged value of the performance.

The second operation may comprise detecting a change in a predicted performance of the ML-Module 30 over the period of time. The drift module 40 may be configured to compute a corresponding single value of the predicted performance $450_i$ on the basis of the respective input dataset $300_i$ of the set of input datasets 300. The input datasets $300_i$ of the set of input datasets 300 may be sent individually to the drift module 40 over the period of time. The drift module 40 may either predict the performance of the ML-Module 30 on the basis of one of the labeled input datasets 320 or one of the unlabeled input datasets 310.

The third operation may comprise determining a value of a first key figure. The value of the first key figure may indicate a correlation between the change in the performance of the ML-Module 30 and the change in the predicted performance of the ML-Module 30.

The fourth operation may comprise providing a signal, the signal indicating the value of the first key figure. For example, the processor 12 may initiate displaying the signal on the display 2 via the interface 3.

The expression "module", as used herein, may describe any hardware, software, firmware, artificial intelligence, fuzzy-logic or combination of hardware and software that is able to execute the function associated with the respective "module".

The processor 12 may perform the first, second, third and fourth operation by executing a first program module 101, a second program module 102, a third program module 103 and a fourth program module 104 respectively. The processor 12 may execute a main program. The main program may initiate an execution of the program modules 101, 102, 103, 104 on the processor 12. The program modules 101, 102, 103, 104 may be part of the program modules 20.

The computer system 10 may be a standalone computer with no network connectivity that may receive data to be processed through a local interface. Such operation may, however, likewise be performed using a computer system that is connected to a network such as a communications network and/or a computing network.

Figure 2:
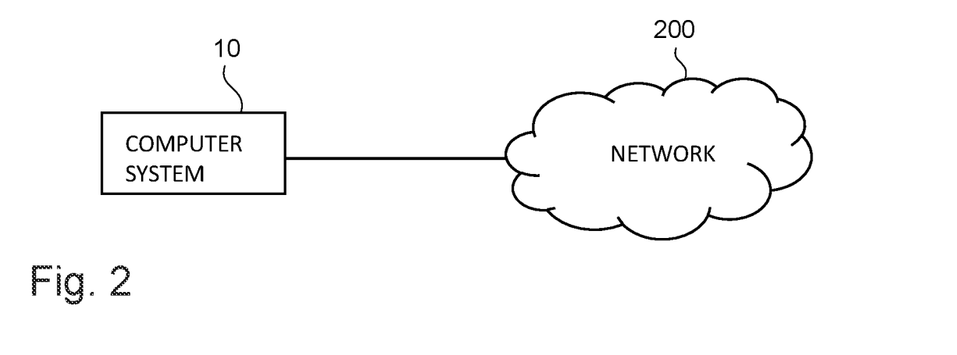
FIG. 2 depicts an example network connected to the computer system of FIG. 1.

FIG. 2 shows an example computing environment where a computer system such as computer system 10 is connected, e.g., using the network adapter 19, to a network 200, consistent with some embodiments. Without limitation, the network 200 may be a communications network such as the internet, a local-area network (LAN), a wireless network such as a mobile communications network, etc. The network 200 may comprise a computing network such as a cloud-computing network. The computer system 10 may receive data to be processed from the network 200 and/or may provide a computing result to another computing device connected to the computer system 10 via the network 200.

The computer system 10 may perform operations described herein, such as the first, second, third, fourth, fifth, sixth and seventh operation entirely or in part, in response to a request received via the network 200. In particular, the computer system 10 may perform such operations in a distributed computation together with one or more further computer systems that may be connected to the computer system 10 via the network 200. For that purpose, the computing system 10 and/or any further involved computer systems may access further computing resources, such as a dedicated or shared memory, using the network 200.

The computer system 10 may be configured for functions such as executing the ML-Module 30 on the computer system 10, in the following referred to as fifth functions. The fifth functions may comprise loading a structure and values of parameters of model functions of a neuronal net, a convolutional neuronal net and/or a radial basis function net from the storage system 16 into the RAM 1 and computing the corresponding output datasets 350 on the basis of the respective labeled input datasets 320. The respective labeled input dataset $320_i$ on the basis of which the corresponding output dataset $350_i$ may be calculated may correspond to this output dataset $350_i$ and vice versa.

Furthermore, the computer system 10 may be configured for functions such as receiving the input datasets 300 via the interface 3, in the following referred to as sixth function, and sending the output datasets 350 via the interface 3 to the display 2 or to a machine being within the network 200 being coupled with the computer system 10 via the interface 3, in the following referred to as seventh function.

The processor 12 may perform the fifth functions, the sixth and seventh function by executing a fifth program module 105, a sixth program module 106 and a seventh program module 107 respectively. The main program may initiate an execution of the program modules 105, 106, 107 on the processor 12. The program modules 105, 106, 107 may be part of the program modules 20.

The ML-Module 30 may be considered as an entity comprising the structure and the values of the parameters of the model functions, and, in one example, comprising also the program modules 105, 106, 107 for running the neuronal net, the convolutional neuronal net and/or the radial basis function net on the processor 12, being loaded in the cache memory 15. The ML-Module 30 may be provided by the computer system 10 as the structure and the values of the parameters of the model functions may be loaded in the cache memory 15 or stored in the storage system 16 and the program modules 105, 106, 107 may be part of the program modules 20.

The ML-Module 30 may be in a trained state for performing the present method. In an untrained state of the ML-Module 30, the values of the parameters of the model functions may be equal to random values. This may be achieved by initialization of the ML-Module 30, wherein the values of the parameters of the model functions may be set to random values. A training of the ML-Module 30 may be performed on the basis of training datasets 600 shown in FIG. 6, consistent with some embodiments. Each training dataset $600_i$ may comprise an input dataset $610_i$ and an output dataset $620_i$.

Figure 6:
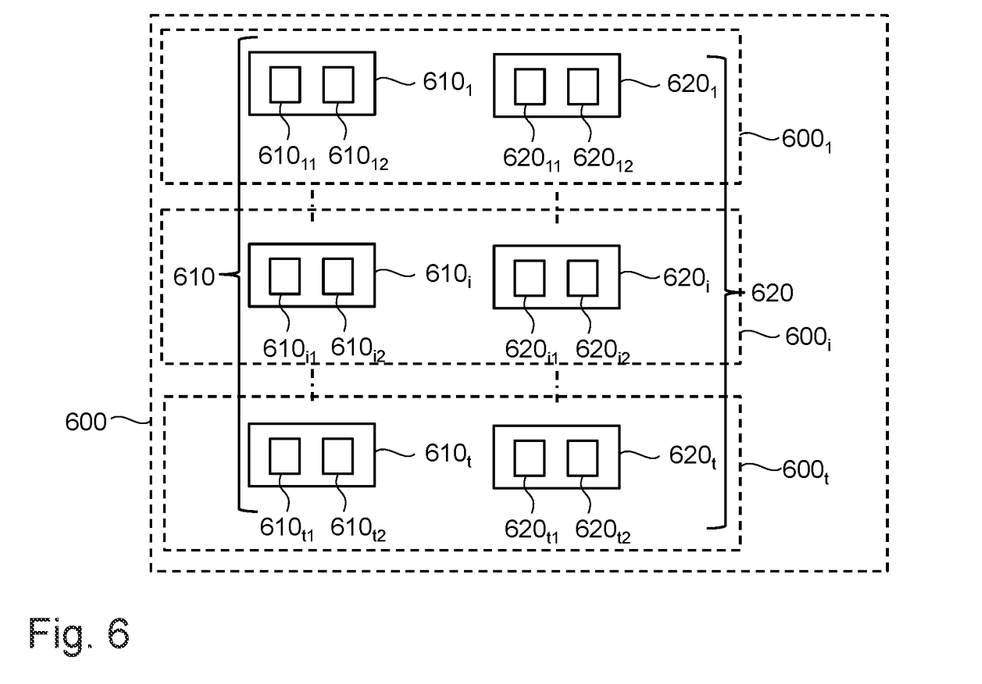
FIG. 6 depicts an example of training datasets for the machine learning module of FIG. 3.

The input and the output datasets of the training datasets 600 may have data elements. These data elements may be values, e.g., real values. The input datasets 610 of the training datasets 600 may have the same structure as the input datasets 300. Similarly, the output datasets 620 of the training datasets 600 may have the same structure as the output datasets 350.

In one example, the training datasets 600 may represent information about a classification problem, for which the ML-Module 30 may be used after it has been trained with the training datasets 600. With respect to the first use case, the first values $610_{11}$, $610_{i1}$, $610_{t1}$ and second values $610_{12}$, $610_{i2}$, $610_{t2}$ of the respective input datasets $610_1$, $610_i$, $610_t$ of the training datasets 600 may be each a value of a feature for classifying the respective input dataset $610_1$, $610_i$, $610_t$ of the training datasets 600 into one of several different classes, for example two different classes. A type of each different class may be indicated by a respective first value $620_{11}$, $620_{i1}$, $620_{t1}$ and by a respective second value $620_{12}$, $620_{i2}$, $620_{t2}$ of each respective output dataset $620_1$, $620_i$, $620_t$ of the training datasets 600. The values of each input and output dataset of the training datasets 600 may be obtained by experiments, such as the supervised experiments mentioned above.

With respect to the first use case, the respective input datasets $300_1$, $300_i$, $300_t$ may each comprise a first value $300_{11}$, $300_{i1}$, $300_{t1}$ and a second value $300_{12}$, $300_{i2}$, $300_{t2}$. The respective first value $300_{11}$, $300_{i1}$, $300_{t1}$ and second value $300_{12}$, $300_{i2}$, $300_{t2}$ may each be a value of the feature for classifying the respective input dataset $300_1$, $300_i$, $300_t$ into one of the several different classes, for example the two different classes. A similar notation may be used in the FIG. 3 for the labeled input datasets 320 and the unlabeled input datasets 310 in FIG. 5. A type of each different class may be indicated by a respective first value $350_{11}$, $350_{i1}$, $350_{t1}$ and by a respective second value $350_{12}$, $350_{i2}$, $350_{t2}$ of each respective output dataset $350_1$, $350_i$, $350_t$.

The training of the ML-Module 30 may be performed using the training datasets 600 such that the values of the parameters of the model functions of the ML-Module 30 may be adapted to reduce a training error of the ML-Module 30. The training error may be calculated on the basis of deviations of calculated values of training output datasets of the ML-Module 30 calculated by the ML-Module 30 from the values of each output dataset $620_i$ of the respective training datasets $600_i$. Each training output dataset of the ML-Module 30 may be calculated on the basis of the input dataset of the respective training dataset $600_i$. The training error may be reduced as described above using one or more learning algorithms such as linear regression, backpropagation, K-means, etc.

Figure 7:
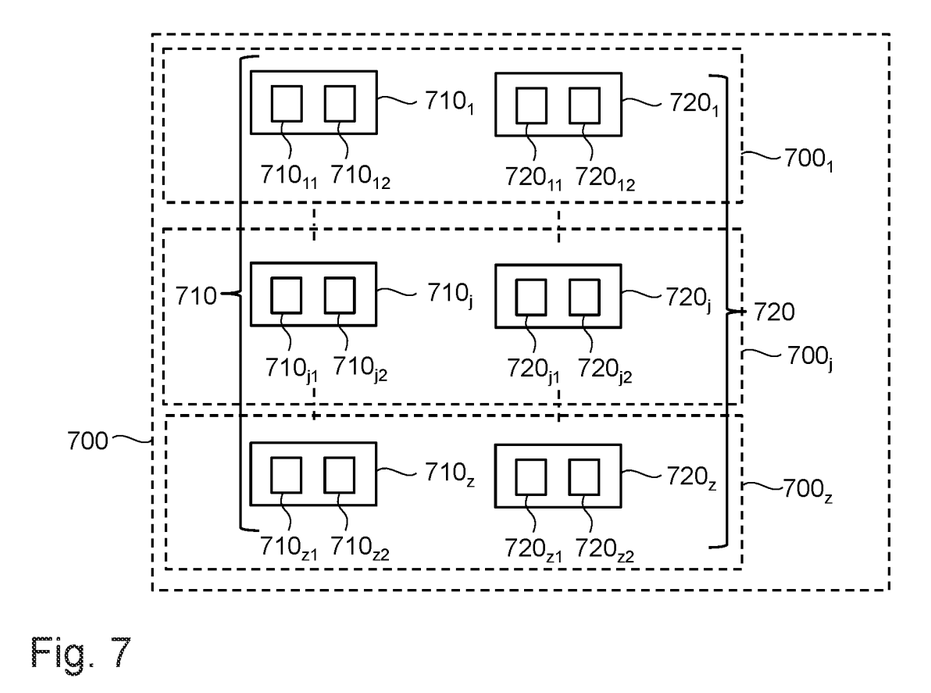
FIG. 7 depicts an example of test datasets for the machine learning module of FIG. 3.

FIG. 7 shows test datasets 700 for testing the ML-Module 30, consistent with some embodiments. The test datasets 700 may have the same structure as the training datasets 600 and may be obtained performing the similar experiments being performed for obtaining the training datasets 600. The processor 12 may compute a test performance of the ML-Module 30 using the test datasets 700. In one example, the processor 12 may calculate deviations of first and second values of test output datasets calculated using the ML-Module 30 from the first values $720_{j1}$ and the second values $720_{j2}$ of each output dataset $720_j$ of the respective test datasets $700_j$ as described above.

Each test output dataset of the ML-Module 30 and deviation of the first and second value of each test output dataset may be calculated using the ML-Module 30 on the basis of the input dataset $710_j$ of the respective test dataset $700_j$ and may therefore be associated to the respective test dataset $700_j$. Therefore, the respective deviation of the first and second value of each test output dataset may each correspond to the input dataset $710_j$ of the respective test dataset $700_j$. The test output datasets of the ML-Module 30 may have the same structure as the output datasets $720_j$ of the test datasets $700_j$. In one example, the processor 12 may compute the test performance as an average of all the deviations of respective first and second values of all the test output datasets together.

According to one example, the processor 12 may compute the change in the performance of the ML-Module 30 by computing a difference between the i-th performance or the first averaged value of the performance and the test performance. The processor 12 may compute a scaled change in the performance of the ML-Module 30. The scaled change in the performance of the ML-Module 30 may be equal to the i-th performance or the first averaged value of the performance divided by the test performance.

According to one example, the computer system 10 may comprise a database 60 being stored on the storage system 16 as shown in FIG. 1. The database 60 may comprise the training datasets 600 and the test datasets 700. The processor 12 may also store the input datasets 300 and the output datasets 350 being provided during the period of time in the database 60. The period of time may be a usage time of the ML-Module 30 in which the ML-Module 30 is used by the user.

In one example, the drift module 40 may be configured to compute the respective value of the predicted performance $450_i$ of the ML-Module 30 on the basis of a result of an analysis of the respective input dataset $300_i$. The drift module 40 may perform the analysis of the respective input dataset $300_i$ by performing a comparison of the respective input dataset $300_i$ with the input datasets 710 of the test datasets 700.

According to one example, the input datasets $710_j$ of the test datasets 700 may be stored in the database 60 being assigned to different performance classes. The input datasets $710_j$ may be each assigned to one of the classes according to their corresponding deviations of the calculated first and second values of test output datasets being computed based on the respective input dataset $710_j$ using the ML-Module 30. An assigning of the input datasets $710_j$ to the different classes, for example the low, high, and average performing class as mentioned above, may be performed by the processor 12, for example using the criteria described above.

The drift module 40 may perform the comparison of the respective input dataset $300_i$, for example of the unlabeled input dataset $310_i$, with the input datasets 710 by computing a respective i-th set of cosine distances. A respective j-th cosine distance of the respective i-th set of cosine distances may each be equal to the cosine distance between the i-th unlabeled input dataset $310_i$ and the j-th respective input dataset $710_j$ of the test datasets 700. Based on the i-th set of respective cosine distances the drift module 40 may select the minimal cosine distance of the i-th set.

According to one simple example, the drift module 40 may set the value of the predicted performance $450_i$ equal to "1" if the minimal cosine distance of the i-th set is calculated based on one of the input datasets $710_j$ which is assigned to the high performing class. Following the simple example, the drift module 40 may set the value of the predicted performance $450_i$ equal to "0" if the minimal cosine distance of the i-th set is calculated based on one of the datasets $710_j$ which is assigned to the low performing class. If the drift module 40 may compute the predicted performance $450_i$ by direct comparison of the unlabeled input dataset $310_i$ with the input datasets $710_j$, as described above, the processor 12 may display the input datasets $710_j$ being associated with the minimal cosine distance of the i-th set on the display 2. Thus, a result given by the drift module 40 may be easily followed up by the user.

According to a further example, the drift module 40 may function in the form of a "black box". In this case, the drift module 40 may be generated using the test datasets 700 and may comprise a neural net 41.

The neural net 41 may be in a trained state after a training of the neural net 41 and may be used to compute the value of the predicted performance $450_i$ on the basis of the respective input dataset $300_i$ of the drift module 40. Thereby, the respective input dataset $300_i$ may serve as input dataset of the neural net 41. The drift module 40 may calculate a corresponding first output value $out_{i1}$ and a corresponding second output value $out_{i2}$ of the neural net 41 on the basis of the respective input dataset $300_i$ using the trained neural net 41.

The computer system 10 may be configured for functions such as executing the Drift module 40 on the computer system 10, in the following referred to as eighth functions. The eighth functions may comprise loading a further structure and values of parameters of further model functions of the neural net 41, a further convolutional neuronal net and/or a further radial basis function net from the storage system 16 into the RAM 1 and computing the predicted performance $450_i$ on the basis of the respective input dataset $300_i$.

Furthermore, the computer system 10 may be configured for functions such as receiving the input dataset $300_i$ via the interface 3, in the following referred to as ninth function, and sending the predicted performance $450_i$ via the interface 3 to the display 2, in the following referred to as tenth function.

The processor 12 may perform the eighth functions, the ninth and tenth function by executing a eighth program module 108, a ninth program module 109 and a tenth program module 110 respectively. The main program may initiate an execution of the program modules 108, 109, 110 on the processor 12. The program modules 108, 109, 110 may be part of the program modules 20.

The Drift module 40 may be considered as an entity comprising the further structure and the values of the parameters of the further model functions, and, in one example, comprising also the program modules 108, 109, 110 for running the neural net 41, the further convolutional neuronal net and/or the further radial basis function net on the processor 12, being loaded in the cache memory 15. The Drift module 40 may be provided by the computer system 10 as the further structure and the values of the parameters of the further model functions may be loaded in the cache memory 15 or stored in the storage system 16 and the program modules 108, 109, 110 may be part of the program modules 20.

The neural net 41 may be in a trained state for computing the predicted performance $450_i$. In an untrained state of the neural net 41, the values of the parameters of the further model functions may be equal to random values. This may be achieved by initialization of the neural net 41, wherein the values of the parameters of the further model functions may be set to random values. The processor 12 may perform a training of the neural net 41 on the basis of the test datasets 700 and the respective deviations of the first value and the second value of each test output dataset being computed on the basis of the respective input dataset $710_j$ of the respective test dataset $700_j$. These respective deviations may serve as target values for a training of the neural net 41 of the drift module 40. In this example, the respective deviation of the first value of each test output dataset may serve as a respective first target value corresponding to the respective input dataset $710_j$. Similarly, the respective deviation of the second value of each test output dataset may serve as a respective second target value corresponding to the respective input dataset $710_j$. The respective input dataset $710_j$ may serve as an input dataset of the neural net 41 for the training of the neural net 41.

The training of the neural net 41 may be performed using the test datasets 700 such that the values of the parameters of the further model functions of the neural net 41 may be adapted to reduce a training error of the neural net 41. The training error may be calculated on the basis of deviations of calculated values of training output datasets of the neural net 41 calculated by the neural net 41 from respective deviations of the first value and the second value of each test output dataset. Each training output dataset of the neural net 41 may be calculated on the basis of the input dataset $710_j$ of the respective test dataset $700_j$. The training error may be reduced as described above using one or more learning algorithms such as linear regression, backpropagation, K-means, etc.

The drift module 40 may calculate an average value of the first output value $out_{t1}$ and the second output value $out_{t2}$. Furthermore, the drift module 40 may perform a comparison of this average value with the averaged deviations of the low performing class, the high performing class and the average performing class mentioned above. The drift module 40 may set the value of the predicted performance $450_i$ equal to "1" if the average value of the first output value $out_{t1}$ and the second output value $out_{t2}$ lie in a range of the averaged deviations which may be assigned to the input dataset $710_j$ which are grouped in the high performing class.

The drift module 40 may set the value of the predicted performance $450_i$ equal to "0" if the average value of the first output value $out_{t1}$ and the second output value $out_{t2}$ lies in a range of the averaged deviations which may be assigned to the input dataset $710_j$ which are grouped in the low performing class. If the drift module 40 may calculate the value of the predicted performance $450_i$ equal to "0" on the basis of the input dataset $300_i$, which may be an actual input dataset of the ML-Module 30, the user may decide not to use the output dataset $350_i$.

The processor 12 may detect a change in the predicted performance by calculating a change of an averaged value of the predicted performance $450_i$ over the period of time. In one example, the processor 12 may compute the averaged value of the predicted performance on the basis of a given number, for example one hundred, of recently calculated values of the predicted performance.

In another example, the processor 12 may determine the change in the predicted performance by calculating a difference between the averaged value of the predicted performance and an averaged value of test predicted performances computed on the basis of the input datasets 710 of the test datasets 700 and/or on the basis of the input datasets 610 of the training datasets 600. To realize this, the processor 12 may initiate a computation of the test predicted performances, each test predicted performance being computed similarly to the predicted performance $450_i$, wherein the respective input datasets $710_j$ of the test datasets $700_j$ and/or the respective input datasets $610_i$ of the training datasets $600_i$ may be presented to the drift module 40 instead of the input dataset $310_i$.

The processor 12 may compute a scaled change in the predicted performance. The scaled change in the predicted performance may be equal to a value of the change in the predicted performance divided by the averaged value of the test predicted performances.

Furthermore, the processor 12 may compute the value of the first key figure as a quotient of the scaled change in the predicted performance and the scaled change in the performance of the ML-Module 30. If the value of the first key figure is close to "1", for example within the range of "0.8" and "1.2", the change in the predicted performance may be correlated with the change in the performance of the ML-Module 30 according to one example. If the value of the first key figure is less than "0.8" or greater than "1.2" the change in the predicted performance may not be correlated with the change in the performance of the ML-Module 30 according to one example. Thus, the first threshold mentioned above may be equal to "0.8" in one example.

The processor 12 may set and display the first alarm signal on the display 2 if the value of the first key figure lies within the range of "minus infinity" and "0.8" and/or if the value of the first key figure lies within the range of "1.2" and "infinity". The processor 12 may initiate a retraining of the drift module 40 using the labeled input datasets 320, and in one example using the labeled input datasets 320 and the unlabeled input datasets 310, if the first alarm signal is set.

The second threshold may be equal to twenty percent. The processor 12 may set and display the second alarm signal on the display 2 if the first alarm signal is set and the change in the performance of the ML-Module 30 is greater than the second threshold. The processor 12 may initiate a retraining of the drift module 40 using the labeled input datasets 320 if the second alarm signal is set.

The third threshold may be equal to thirty percent. The processor 12 may set and display the third alarm signal on the display 2 if the change in the performance of the ML-Module 30 is greater than the third threshold. The processor 12 may initiate a retraining of the ML-Module 30 using the labeled input datasets 320 and, in one example using the labeled input datasets 320 and the unlabeled input datasets 310, if the third alarm signal is set.

Furthermore, the computer system 10 may comprise a data analysis module 120. The data analysis module 120 may be a part of the program modules 20. The processor 12 may execute the data analysis module 20 to perform functions of the data analysis module 120 mentioned in the following. The data analysis module 120 may be configured to perform a first analysis of the training datasets 600 and/or the test datasets 700 and a second analysis of the input datasets 300. In one example, the data analysis module 120 may further be configured to determine the value of the second key figure on the basis of a result of the first analysis and a result of the second analysis. The value of the second key figure may indicate a deviation of the datasets of the training datasets 600 and/or the test datasets 700 as a whole from the input datasets 300 as a whole.

The first analysis may comprise identifying extreme values of the training datasets 600 and/or the test datasets 700. The second analysis may comprise identifying extreme values of the input datasets 300. In one example, the data analysis module 120 may compute a first absolute value being equal to a difference between a minimal value of the training datasets 600 and/or the test datasets 700 and a minimal value of the input datasets 300. According to this example, the data analysis module 120 may compute a second absolute value being equal to a difference between a maximal value of the training datasets 600 and/or the test datasets 700 and a maximal value of the input datasets 300. The data analysis module 120 may set the value of the second key figure equal to a maximum of the first and second absolute value.

Alternatively, or in addition, the first analysis may comprise identifying a standard deviation and/or a mean value of the training datasets 600 and/or the test datasets 700 and the second analysis may comprise identifying a standard deviation and/or a mean value of the input datasets 300. In this case, the data analysis module 120 may set the value of the second key equal to a difference between the standard deviation or mean value of the training datasets 600 and/or the test datasets 700 and the standard deviation or mean value of the input datasets 300.

The processor 12 may display the fourth alarm signal on the display 2 to indicate the need for retraining the ML-Module 30 if the value of the second key figure is greater than the fourth threshold. The ML-Module 30 may be retrained using the labeled input datasets 320. The fourth threshold may be set by the user.

Similarly, the processor 12 may display the fifth alarm signal on the display 2 to indicate the need for retraining the drift module 40 if the value of the second key figure is greater than the fifth threshold. The drift module 40 may be retrained using the labeled input datasets 320. The fifth threshold may be set by the user.

Furthermore, the processor 12 may display the sixth alarm signal if the value of the second key figure is less than the sixth threshold and the change in the performance of the ML-Module 30 is greater than the seventh threshold. The sixth alarm signal may indicate the need for retraining the drift module 40 on the basis of the labeled input datasets 320.

The data analysis module 120 may further identify a first set of the unlabeled input datasets 310 causing the change in the performance of the ML-Module 30 and may mark the input datasets of the first set of the unlabeled input datasets 310 such that the input datasets of the first set of the unlabeled input datasets 310 are visible for the user on the display 2 for labeling the input datasets of the first set of the unlabeled input datasets 310.

In response to labeling the input datasets of the first set of the unlabeled input datasets 310, the processor 12 may initialize a retraining of the drift module 40 using these input datasets, in the following referred to as retraining input datasets.

The processor 12 may perform a retraining of the neural net 41 on the basis of the retraining input datasets and respective further deviations of a first value and a second value of each further test output dataset being computed on the basis of the retraining input datasets using the ML-Module 30. These respective further deviations may be computed similarly to the respective deviations of the first value and the second value of each test output dataset as mentioned above, however, instead of using the test datasets 700, the retraining input datasets with their corresponding labels may be used.

The respective further deviations may serve as target values for the retraining of the neural net 41 of the drift module 40. In this example, the respective further deviation of the first value of each further test output dataset may serve as a respective first target value corresponding to the respective retraining input dataset. Similarly, the respective further deviation of the second value of each further test output dataset may serve as a respective second target value corresponding to the respective retraining input dataset. The respective retraining input dataset may serve as an input dataset of the neural net 41 for the retraining of the neural net 41.

Furthermore, in response to labeling the input datasets of the first set of the unlabeled input datasets 310, the processor 12 may initialize a retraining of the drift ML-Module 30 using these input datasets.

Figure 8:
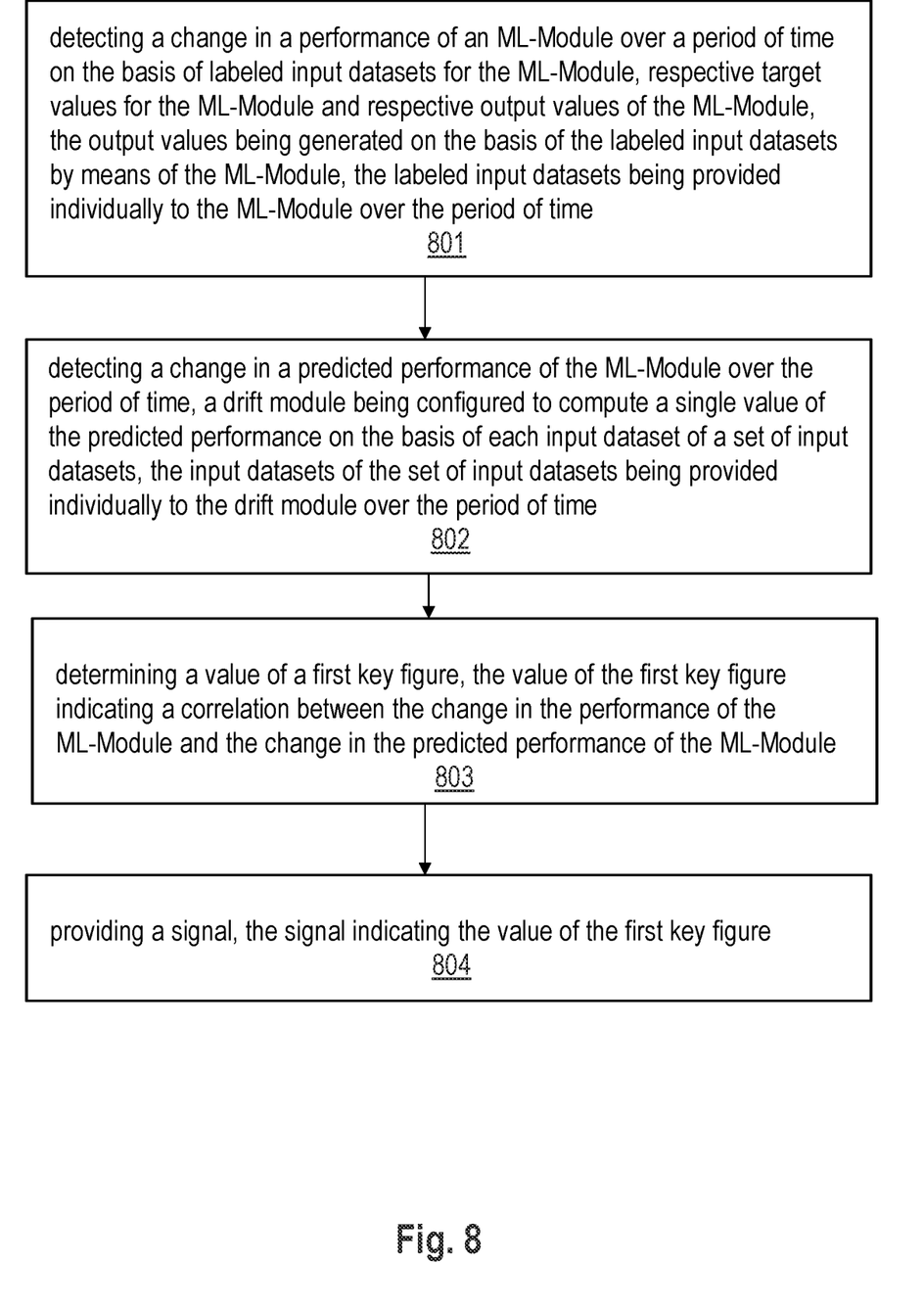
FIG. 8 depicts a flowchart of a computer implemented method for monitoring a drift module, according to some embodiments.

FIG. 8 shows a flowchart of a computer implemented method for scheduling the set 331 of query execution plans, consistent with some embodiments.

In operation 801, the change in the performance of the ML-Module 30 may be detected over the period of time on the basis of the labeled input datasets 320, the respective target datasets 360, and the respective output datasets 350.

In operation 802, the change in the predicted performance of the ML-Module 450$_i$ over the period of time may be detected. The input datasets of the set of input datasets 300 may be provided individually to the drift module 40 over the period of time for calculating each predicted performance of the ML-Module 450$_i$, each on the basis of one of the input datasets 300$_i$.

In operation 803, the value of the first key figure may be determined.

In operation 804, a signal may be provided, the signal indicating the value of the first key figure. The signal may comprise the first, second and/or third alarm signal.

The present disclosure may be a system, a method, and/or a computer program product at any possible technical detail level of integration. The computer program product may include a computer readable storage medium (or media) having computer readable program instructions thereon for causing a processor to carry out aspects of the present disclosure. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, to implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one operation, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for predicting a performance of a machine learning module (ML-Module), the method comprising:
   detecting a change in performance of an ML-Module over a period of time using a labeled input dataset for the ML-Module, a target value for the ML-Module, and an output value of the ML-Module, the output value being generated using the labeled input dataset with the ML-Module, the labeled input dataset being provided individually to the ML-Module over the period of time;
   detecting a change in predicted performance of the ML-Module over the period of time by a drift module, the drift module being configured to compute a single value of the predicted performance using each input dataset of a set of input datasets, the input datasets of the set of input datasets being provided individually to the drift module over the period of time;
   determining a value of a first key figure, the value of the first key figure indicating a correlation between the change in performance of the ML-Module and the change in predicted performance of the ML-Module; and
   providing a signal that indicates the value of the first key figure.

2. The method of claim 1, wherein the signal comprises a first alarm signal; and the method further comprises generating the first alarm signal in response to the value of the first key figure being less than a first threshold, the first alarm signal indicating a need for retraining the drift module.

3. The method of claim 1, wherein the signal comprises a second alarm signal; and the method further comprises generating the second alarm signal in response to the value of the first key figure being less than a first threshold and the change in performance of the ML-Module is greater than a second threshold, the second alarm signal indicating a need for retraining the drift module.

4. The method of claim 1, wherein the signal comprises a third alarm signal; and the method further comprises generating the third alarm signal in response to the change in performance of the ML-Module being greater than a third threshold, the third alarm signal indicating a need for retraining the ML-Module.

5. The method of claim 1, wherein the set of input datasets comprises unlabeled input datasets and labeled input datasets, the labeled input datasets each being assigned to a respective target value of a respective output value of the ML-Module; and the method further comprises:
   identifying a first set of the unlabeled input datasets causing the change in performance of the ML-Module; and
   marking the input datasets of the first set of the unlabeled input datasets such that the input datasets of the first set of the unlabeled input datasets are visible for a user for labeling the input datasets of the first set of the unlabeled input datasets.

6. The method of claim 5, further comprising, in response to labeling the input datasets of the first set of the unlabeled input datasets, retraining the drift module using the input datasets.

7. The method of claim 5, further comprising, in response to labeling the input datasets of the first set of the unlabeled input datasets, retraining the ML-Module using the input datasets.

8. The method of claim 1, further comprising determining the performance of the ML-Module using an accuracy of the ML-Module as a performance measure.

9. The method of claim 1, further comprising determining the performance of the ML-Module using a precision of the ML-Module as a performance measure.

10. The method of claim 1, wherein the ML-Module is in a trained and tested state, wherein a training and a testing of the ML-Module is performed using training datasets and test datasets respectively, and wherein the computing of the predicted performance of the ML-Module comprises comparing the unlabeled input datasets with datasets of a further set of datasets, the further set of datasets comprising the training datasets and the test datasets.

11. The method of claim 1, wherein the ML-Module is in a trained and tested state, wherein a training and a testing of the ML-Module is performed using training datasets and test datasets respectively, and wherein the drift module is generated using a further set of datasets, the further set of datasets comprising the training datasets and the test datasets.

12. The method of claim 1, wherein the ML-Module is in a trained and tested state, wherein a training and a testing of the ML-Module is performed using training datasets and test datasets respectively, wherein the drift module is generated using a further set of datasets, the further set of datasets comprising the training datasets and the test datasets, and wherein the method further comprises:
   performing an analysis of the further set of datasets;
   performing an analysis of the set of input datasets;
   determining a value of a second key figure on the basis of the analysis of the further set of datasets and the analysis of the set of input datasets, the value of the second key figure indicating a deviation of the datasets of the further set as a whole from the input datasets of the set of input datasets as a whole;
   providing a second signal, the second signal indicating the value of the second key figure.

13. The method of claim 12, wherein the second signal comprises a fourth alarm signal, and wherein the method further comprises generating the fourth alarm signal in response to the value of the second key figure being greater than a fourth threshold, the fourth alarm signal indicating a need for retraining the ML-Module.

14. The method of claim 12, wherein the second signal comprises a fifth alarm signal, and wherein the method further comprises generating the fifth alarm signal in response to the value of the second key figure being greater than a fifth threshold, the fifth alarm signal indicating a need for retraining the drift module.

15. The method of claim 12, wherein the second signal comprises a sixth alarm signal, and wherein the method further comprises generating the sixth alarm signal in response to the value of the second key figure being less than a sixth threshold and the change in performance of the ML-Module is greater than a seventh threshold, the sixth alarm signal indicating a need for retraining the drift module.

16. The method of claim 12, wherein the performing of the analysis of the further set of datasets comprises identifying maximum and minimum values of the datasets of the further set of datasets, wherein the performing of analysis of the set of input datasets comprises identifying maximum and minimum values of the input datasets of the set of input datasets, wherein the determining of the value of the second key figure comprises comparing the maximum and minimum values of the datasets of the further set of datasets with the maximum and minimum values of the input datasets of the set of input datasets.

17. The method of claim 12, wherein the performing of the analysis of the further set of datasets comprises identifying a standard deviation of the datasets of the further set of datasets, wherein the performing of analysis of the set of input datasets comprises identifying a standard deviation of the input datasets of the set of input datasets, wherein the determining of the value of the second key figure comprises comparing the standard deviation of the datasets of the further set of datasets with the standard deviation of the input datasets of the set of input datasets.

18. The method of claim 12, wherein the performing of the analysis of the further set of datasets comprises identifying a mean value of the datasets of the further set of datasets, wherein the performing of analysis of the set of input datasets comprises identifying a mean value of the input datasets of the set of input datasets, wherein the determining of the value of the second key figure comprises comparing the mean value of the datasets of the further set of datasets with the mean value of the input datasets of the set of input datasets.

19. A computer program product for monitoring a drift module, the computer program product comprising one or more computer-readable storage media, and program instructions collectively stored on the one or more computer-readable storage media, the program instructions which, when executed, cause the one or more computer processors to:
   detect a change in performance of an ML-Module over a period of time using a labeled input dataset for the ML-Module, a target value for the ML-Module, and an output value of the ML-Module, the output value being generated using the labeled input dataset with the ML-Module, the labeled input dataset being provided individually to the ML-Module over the period of time;
   detect a change in predicted performance of the ML-Module over the period of time by a drift module, the drift module being configured to compute a single value of the predicted performance using each input dataset of a set of input datasets, the input datasets of the set of input datasets being provided individually to the drift module over the period of time;
   determine a value of a first key figure, the value of the first key figure indicating a correlation between the change in performance of the ML-Module and the change in predicted performance of the ML-Module;
   store the first key figure in persistent storage; and
   provide a signal that indicates the value of the first key figure.

20. A computer system for monitoring a drift module, the drift module being configured to predict a performance of a machine learning module (ML-Module) on the basis of an input dataset of a set of input datasets for the ML-Module, the set of input datasets comprising unlabeled input datasets and labeled input datasets, the labeled input datasets each being assigned to a respective target value of a respective output value of the ML-Module, the computer system comprising:
   one or more computer processors;
   one or more computer readable storage media; and
   stored program instructions on the one or more computer readable storage media for execution by the one or more computer processors, the stored program instructions which, when executed, cause the one or more computer processors to:
   detect a change in performance of an ML-Module over a period of time using a labeled input dataset for the ML-Module, a target value for the ML-Module, and an output value of the ML-Module, the output value being generated using the labeled input dataset with the ML-Module, the labeled input dataset being provided individually to the ML-Module over the period of time;

detect a change in predicted performance of the ML-Module over the period of time by a drift module, the drift module being configured to compute a single value of the predicted performance using each input dataset of a set of input datasets, the input datasets of the set of input datasets being provided individually to the drift module over the period of time;

determine a value of a first key figure, the value of the first key figure indicating a correlation between the change in performance of the ML-Module and the change in predicted performance of the ML-Module; and provide a signal that indicates the value of the first key figure.

\* \* \* \* \*